US008352312B2

(12) United States Patent
Carbullido (10) Patent No.: US 8,352,312 B2
(45) Date of Patent: *Jan. 8, 2013

(54) SYSTEM AND METHOD FOR CONTROLLING ACTIONS TAKEN ON VOTING DEVICES

(75) Inventor: Kenneth D. Carbullido, Omaha, NE (US)

(73) Assignee: ES&S Innovations, LLC, Omaha, NE (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/029,511

(22) Filed: Feb. 17, 2011

(65) Prior Publication Data

US 2011/0202464 A1   Aug. 18, 2011

Related U.S. Application Data

(63) Continuation-in-part of application No. 12/704,612, filed on Feb. 12, 2010, now Pat. No. 8,260,660.

(51) Int. Cl.
  *G06F 11/00*  (2006.01)
(52) U.S. Cl. ............... 705/12; 705/50; 705/51; 705/75; 235/386
(58) Field of Classification Search ............. 705/12
See application file for complete search history.

(56) References Cited

U.S. PATENT DOCUMENTS

| | | | |
|---|---|---|---|
| 4,021,780 A | | 5/1977 | Narey et al. |
| 5,682,428 A | | 10/1997 | Johnson |
| 5,751,812 A | * | 5/1998 | Anderson .................... 713/155 |
| 6,067,621 A | * | 5/2000 | Yu et al. .................... 713/172 |
| 6,250,548 B1 | | 6/2001 | McClure et al. |
| 6,550,675 B2 | | 4/2003 | Davis et al. |
| 6,607,126 B2 | | 8/2003 | Altini et al. |
| 6,641,033 B2 | | 11/2003 | McClure et al. |
| 6,662,998 B2 | | 12/2003 | McClure et al. |
| 6,688,517 B1 | | 2/2004 | McClure et al. |
| 7,032,821 B2 | | 4/2006 | McClure et al. |
| 7,231,436 B1 | | 6/2007 | Dalfo et al. |
| 7,497,377 B2 | | 3/2009 | Watson |
| 7,593,916 B2 | | 9/2009 | Heusermann et al. |

(Continued)

OTHER PUBLICATIONS

Performance and Test Standards for Punchcard, Marksense and Diredt Recording Electronic Voting Systems: Federal Election Commission; Jan. 1990 (335 pages).

(Continued)

*Primary Examiner* — Jacob C. Coppola
(74) *Attorney, Agent, or Firm* — Stinson Morrison Hecker LLP (57) ABSTRACT

The present invention is directed to a system and method that allows a central election office to maintain control over actions taken on voting devices located at various polling locations. In an exemplary embodiment, a poll worker or other user contacts the central election office with a request to perform an action on a voting device. An election management system located at the central election office executes a hashing algorithm to generate a first hash code associated with the action. The central election office communicates the first hash code to the polling location, and the poll worker or other user inputs the first hash code into the voting device. The voting device executes the same hashing algorithm to generate a second hash code associated with the action, and compares the second hash code to the first hash code to verify the validity of the first hash code. If the validity of the first hash code is verified, the voting device permits the poll worker or other user to perform the action on the voting device.

50 Claims, 11 Drawing Sheets

U.S. PATENT DOCUMENTS

| | | |
|---|---|---|
| 2001/0035455 A1 | 11/2001 | Davis et al. |
| 2001/0042005 A1 | 11/2001 | McClure et al. |
| 2002/0078358 A1 | 6/2002 | Neff et al. |
| 2002/0158124 A1 | 10/2002 | Altini et al. |
| 2003/0047605 A1 | 3/2003 | McClure et al. |
| 2003/0066872 A1 | 4/2003 | McClure et al. |
| 2003/0149616 A1 | 8/2003 | Travaille |
| 2004/0060983 A1 | 4/2004 | Davis et al. |
| 2005/0218224 A1 | 10/2005 | Boldin |
| 2005/0273382 A1 | 12/2005 | Beartusk et al. |
| 2006/0036871 A1* | 2/2006 | Champine et al. ............ 713/183 |
| 2006/0138226 A1 | 6/2006 | McClure et al. |
| 2007/0051805 A1 | 3/2007 | Iyer et al. |
| 2007/0246534 A1 | 10/2007 | Feldkamp et al. |
| 2008/0262905 A1 | 10/2008 | Casella et al. |
| 2008/0288783 A1 | 11/2008 | Jansen et al. |
| 2009/0072032 A1 | 3/2009 | Cardone et al. |
| 2009/0076891 A1 | 3/2009 | Cardone et al. |
| 2009/0179071 A1 | 7/2009 | Backert et al. |
| 2009/0200375 A1 | 8/2009 | Vehnyakov et al. |

OTHER PUBLICATIONS

Voluntary Voting System Guidelines, published more than 1 year prior to Feb. 17, 2011, the filing date of this application (206 pages).
2005 Voluntary Voting System Guidelines; United Stated Election Assistance Commission (228 pages) vol. I;Version 1.0.

* cited by examiner

Registrant Information

Center 1 024 – Total Voters: 1

School District 82-Board Election
NOVEMBER 10, 2009
Hall County, NE

Your search results are below. Select the name of the voter to view the registration details.

Search Details: 2 Voter(s) returned

| Name | Address | Year of Birth | Status | Registrant ID | Gender |
|---|---|---|---|---|---|
| JOAN A. SMITH | 100 OAK ST. OMAHA, NE 68137 | 1933 | A | 1234567 | FEMALE |
| JOHN A. SMITH | 100 OAK ST. OMAHA, NE 68137 | 1929 | A | 7654321 | MALE |

Page 1 of 1

SYSTEM AND METHOD FOR CONTROLLING ACTIONS TAKEN ON VOTING DEVICES

CROSS-REFERENCE TO RELATED APPLICATIONS

This application is a continuation-in-part of, and claims priority to, U.S. patent application Ser. No. 12/704,612, filed on Feb. 12, 2010, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems, and, more particularly, to a system and method for maintaining control over actions taken on voting devices located at various polling locations.

2. Description of Related Art

A variety of different types of voting devices are used in the United States and throughout the world. For example, many jurisdictions use electronic poll books that allow a poll worker to access a database of all the voters registered to vote in a particular election. When a voter enters a polling location, the poll worker uses the electronic poll book to search for the voter's record in the database, confirm that the voter has not yet voted in the election, and issue a voting credit to the voter. In many jurisdictions, the database resides locally on the electronic poll book, which may be periodically synchronized with a central voter database. Alternatively, the electronic poll book may communicate with the central voter database in real-time, in which case the validation of a voter's eligibility to vote and issuance of a voting credit is made directly against the central voter database.

Upon validation of a voter's eligibility to vote, several different types of voting devices are available for use by voters to cast their votes in a particular election. For example, in many jurisdictions, a voter receives a traditional paper ballot on which is printed the various races to be voted on. The voter votes by darkening or otherwise marking the appropriate mark spaces on the paper ballot. The marked paper ballot is then inserted into a ballot tabulation device for tabulation of the votes marked on the paper ballot.

In jurisdictions that use traditional paper ballots, an electronic ballot marking device may also be provided for use by voters who are blind, vision-impaired, or have a disability or condition that would make it difficult or impossible to manually mark a paper ballot in the usual way. In operation, a voter receives a paper ballot from a poll worker and takes the paper ballot to the ballot marking device. The voter inserts the paper ballot into the device, whereby the paper ballot is scanned and the various races to be voted on are presented to the voter either visually on a touch screen display or audibly via headphones. The voter then selects his/her votes using one of several different types of input devices (e.g., a touch screen display, Braille-embossed keys, etc.). Once the voter confirms that the selected votes are correct, a printer marks the paper ballot by printing marks in the appropriate mark spaces on the paper ballot. The voter or a poll worker then inserts the marked paper ballot into a ballot tabulation device for tabulation of the votes marked on the paper ballot.

In recent years, many jurisdictions have turned to electronic voting machines (such as direct recording electronic (DRE) voting machines) in lieu of traditional paper ballots. Typically, an electronic voting machine includes a touch screen display for displaying the various races to be voted on and allowing the "touch" selection of votes. Once the voter confirms that the selected votes are correct, the voting selections are recorded in the memory of the voting machine and electronically tabulated with the voting selections of other voters. The electronic voting machine may also include an audio ballot function for use by voters with disabilities.

In view of the different types of voting devices that are used at various polling locations, poll workers are trained to perform routine actions on the voting devices so as to enable the voting process to run smoothly on election day or during an early voting period. However, it is difficult to train poll workers to perform every action that may be required to be performed on the voting devices. In addition, many election adminstrators are cautious about allowing poll workers to perform certain actions that are out of the ordinary routine. In some cases, an election administrator may not allow a poll worker to perform a particular action and will send in a qualified county employee to perform the action. In this case, it takes time for the county employee to arrive at the polling location, which causes delay for the voters waiting to cast their ballots.

BRIEF SUMMARY OF THE INVENTION

The present invention is directed to a system and method that allows an election administrator at a central election office to maintain control over actions taken by poll workers or other users on voting devices located at various polling locations. In an exemplary embodiment, a poll worker or other user telephones, e-mails, or otherwise contacts the central election office with a request to perform an action on a voting device. The central election office accesses an election management system that executes a hashing algorithm to generate a first hash code associated with the action. The first hash code is generated by the hashing algorithm using data stored in the election management system (wherein such data is also stored in the voting device) and/or using information entered into the election management system in connection with the request to perform the action. The central election office then communicates the first hash code to the polling location, such as by telephone, e-mail, or any other type of communication method.

At the polling location, the poll worker or other user enters the first hash code into an input device of the voting device in connection with the action to be performed. The voting device executes the same hashing algorithm to generate a second hash code associated with the action. The voting device then compares the second hash code to the first hash entered by the poll worker or other user in order to verify the validity of the first hash code. If the validity of the first hash code is verified, the voting device permits the performance of the requested action. Accordingly, the poll worker or other user is able to perform the action only if she has notified the central election office and obtained the necessary approval (i.e., the first hash code) to perform the action on the voting device.

DETAILED DESCRIPTION OF EXEMPLARY EMBODIMENTS

The present invention will be described in detail below with reference to various exemplary embodiments; however, it should be understood that the invention is not limited to the specific configuration or methodology of these embodiments. In addition, although the exemplary embodiments are described as embodying several different inventive features, one skilled in the art will appreciate that any one of these features could be implemented without the others in accordance with the invention.

In general, the present invention is directed to a system and method that allows an election administrator at a central election office to maintain control over actions taken by poll workers or other users on voting devices located at various polling locations. As used herein, "voting device" means any device that is used in connection with the election system. Examples of voting devices include, but are not limited to, (i) electronic poll books used to check-in voters and (ii) devices used to cast votes in an election, such as ballot tabulation devices, electronic ballot marking devices, and electronic voting machines (such as direct recording electronic (DRE) voting machines). Of course, other types of voting devices are also within the scope of the invention, including those that are connected to the central election office and those that are not connected to the central election office.

One skilled in the art will appreciate that the types of actions that can be controlled by the election administrator at the central election office are limitless. In many instances, the actions comprise actions taken by poll workers on various voting devices. As such, the invention may be used to ensure that poll workers do not take any actions outside of the ordinary election day activities, unless the poll workers notify the central election office and obtain approval to perform the actions. In other instances, the actions comprise actions taken by other types of users, such as machine technicians, election officials, or other election participants (e.g., policemen who have the function of carrying ballots and results information/tapes back to the central warehouse). It is also contemplated that the actions may comprise actions taken by voters (e.g., actions taken on a self-service voting station). Thus, the present invention enables the election administrator to decide which actions require the knowledge and prior approval of the central election office by programming the voting devices accordingly. Preferably, the invention also provides for the auditability of actions controlled by the central election office. For example, if an action is performed with the knowledge and approval of the central election office, the voting device may add the action to its audit record and the central election office may also document the action. As such, the performance of the action can be explained and accounted for during an audit procedure.

Exemplary Actions Taken on Poll Book

Figure 1:
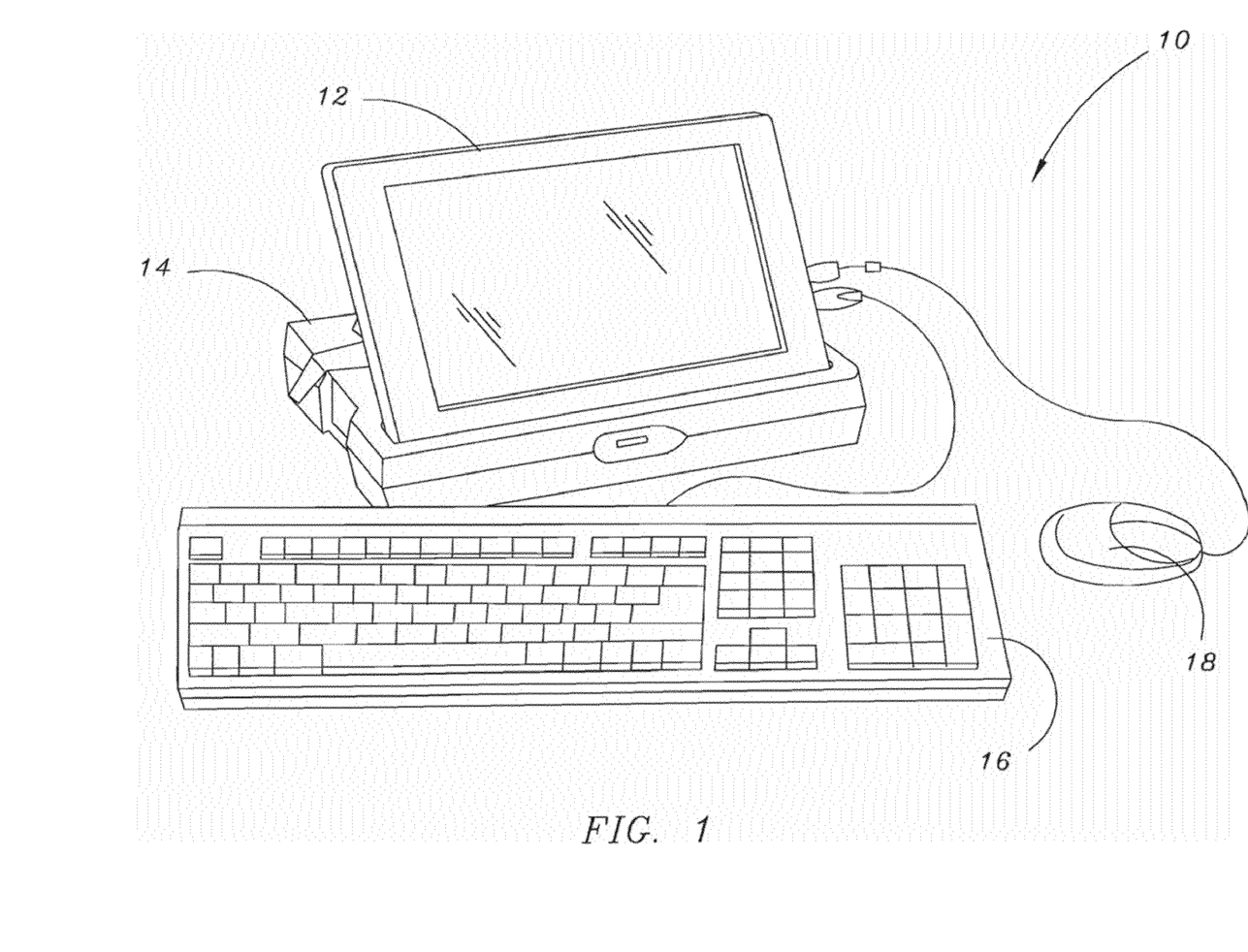
FIG. 1 is a perspective view of an exemplary electronic poll book.

The present invention may be used to maintain control over certain actions taken on an electronic poll book system, such as the system shown generally as reference numeral 10 in FIG. 1. In this example, system 10 includes a poll book 12 mounted on a base 14 that serves to hold the poll book 12 in a slightly-angled upright position during use. When not in use, base 14 is used as a protective case for poll book 12 during transport and storage. Preferably, poll book 12 includes a touch screen display 13 that serves as both an input device and output device. Poll book 12 may also be connected to other types of input devices, such as a standard keyboard 16 and a mouse 18. In addition, other accessories (not shown) may be connected to poll book 12, such as a signature capture device for electronically capturing a voter's signature during voter check-in, a barcode reader for scanning the barcode on a voter registration card in order to immediately locate a voter registration record, a magnetic stripe reader for scanning identification cards such as a driver's license or state identification, and/or a printer for printing poll book reports.

Poll book 12 comprises a computing system (such as a programmed general purpose computer, a special purpose computer, or the like) that includes a processor and a storage device for storing a voter database. The processor of poll book 12 is operable to execute computer-readable instructions (e.g., software or firmware) stored on a computer-readable medium to thereby perform the various processes of the present invention, including the hash code verification process described below. The storage device of poll book 12 may comprise any type of computer memory, such as the computer's internal hard drive or a removable USB flash drive. One skilled in the art will appreciate that other types of memory devices may also be used in accordance with the present invention.

As just discussed, the voter database is stored locally on the storage device of poll book 12. Preferably, the database contains voter records for all of the registered voters in the jurisdiction. Alternatively, the voter database may only contain voter records for the voters registered to vote at a particular polling location. Poll book 12 may be a standalone unit, or may be connected to other poll books (not shown) located at the same polling location. For example, poll book 12 may act as a host device and may be in communication with one or more poll books performing as slave devices, wherein the voter database is located only on poll book 12. Several types of computer network connections may be used to network the poll books, including a local area network (LAN), wireless local area network (WLAN) or wide area network (WAN).

Poll book 12 may also be connected to a central server (not shown) via a communication network. The communication network may be any combination of analog, digital, wired and wireless communication equipment and infrastructure suitable for transporting information between poll book 12 and the central server. For example, the communication network may include one or more of the following: the Internet, an intranet, a cellular communication system, a Public Switched Telephone Network (PSTN), a private telephone network, or a satellite communication system. In the exemplary embodiment, poll book 12 communicates with the central server via a wired closed network.

Preferably, the central server is located at the central election office and stores a central voter database containing voter records for all of the registered voters in the jurisdiction. All updates to the voter database on poll book 12 are transmitted to the central server, and all updates received by the central server from various polling locations are communicated back to poll book 12. The updates may be transmitted in batches at various times throughout the day, or may be transmitted on a voter-by-voter basis. Using this synchronization process, poll book 12 is able to access the most current voter information.

Of course, other embodiments of the poll book may be implemented in accordance with the present invention. For example, the poll book may not store any type of voter database, and may instead directly access the central voter database stored on the central server. In another example, the central voter database may not store the entire voter records, but may instead store only a transaction log of the updates made to the various poll books. In yet another example, the poll book may not be connected to a central server, in which case the voter database loaded onto the poll book will not be updated in any manner, or may be manually updated via a removable memory device.

The following are examples of actions performed by poll workers or other users on a poll book that may require the knowledge and prior approval of the central election office (as determined by the election administrator):

a. Using the poll book to un-issue a voting credit previously issued to a voter (described in greater detail below).
b. Using the poll book to change a voter address.
c. Using the poll book to change a party of a registered voter.
d. Using the poll book to issue a provisional ballot to a voter (such as in cases where a voting credit has previously been issued to a voter or where a voter is not in the voter database of the poll book due to an address change).
e. Recovering the poll book from a failure condition (in which case a recovery process allows a poll worker to shut-down the poll book and recover all activity).
f. Synchronizing the poll book's voter database with the central voter database (such as in cases where the automated synchronization routine fails or where a poll worker desires to manually synchronize the databases).
g. Updating firmware on the poll book.
h. Using the poll book to print reports.

Of course, one skilled in the art will understand that other types of actions may be controlled by the central election office in accordance with the present invention.

Exemplary Actions Taken on Ballot Tabulation Device

Figure 5:
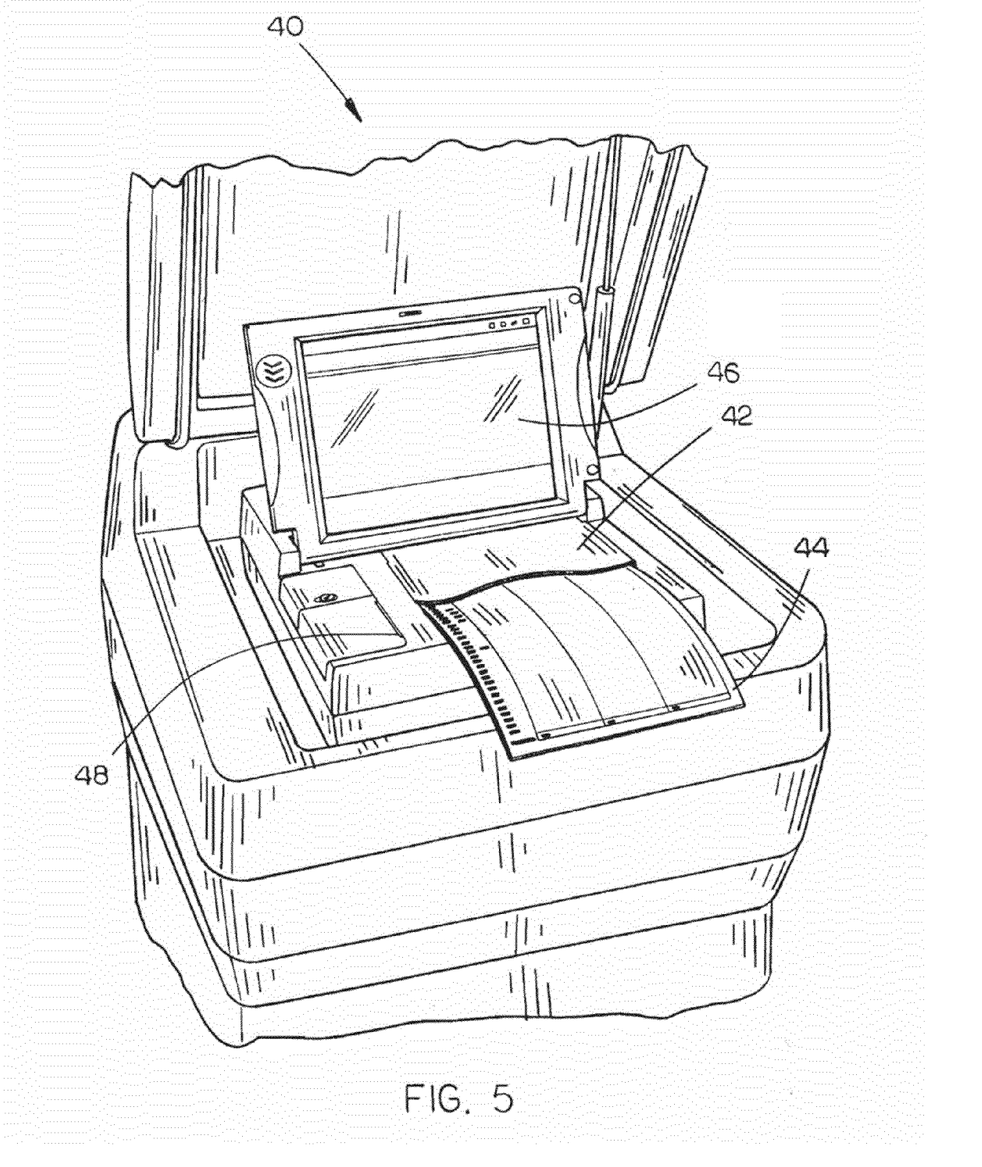
FIG. 5 is a perspective view of an exemplary ballot tabulation device.

The present invention may also be used to maintain control over certain actions taken on a ballot tabulation device, such as the device shown generally as reference numeral 40 in FIG. 5. In this example, ballot tabulation device 40 includes a ballot insertion tray 42 that is provided to receive a paper ballot 44 for scanning and tabulation. Preferably, ballot tabulation device 40 includes a touch screen display 46 that serves as both an input device and output device. Alternatively, if the display is not configured as a touch screen display, the ballot tabulation device 40 would also include another type of input device, such as a keyboard, a joystick, a pointing device, a trackball or a physical keypad. Ballot tabulation device 40 also includes an internal report printer for printing various reports, including the printing of reports at poll opening and poll closing (as are known in the art). As shown in FIG. 5, the report paper passes through an aperture 48 in the protective housing such that it is easily accessible by poll workers.

Ballot tabulation device 40 includes a processor and a storage device for storing various types of data, including election data that was loaded from the election management system. The processor of ballot tabulation device 40 is operable to execute computer-readable instructions (e.g., software or firmware) stored on a computer-readable medium to thereby perform the various processes of the present invention, including the hash code verification process described below. The storage device of ballot tabulation device 40 may comprise any type of computer memory, such as the device's internal hard drive or a removable USB flash drive. One skilled in the art will appreciate that other types of memory devices may also be used in accordance with the present invention.

The following are examples of actions performed by poll workers or other users on a ballot tabulation device that may require the knowledge and prior approval of the central election office (as determined by the election administrator):

a. Clearing vote totals on the ballot tabulation device in order to erase any votes stored in the database (such as in cases where the device was delivered to the polling location with "test votes" because the warehouse staff failed to clear the vote totals after the testing procedure).
b. Locking the ballot tabulation device each night during an early voting period.
c. Unlocking the ballot tabulation device each morning during an early voting period.
d. Opening polls on the ballot tabulation device.
e. Re-opening polls on the ballot tabulation device (such as in cases where a poll worker mistakenly closes the polls early and there are still voters in the polling location that desire to vote, or, where an election administrator prefers to open and close polls during an early voting period instead of simply locking the device).
f. Closing polls on the ballot tabulation device.
g. Changing a modem telephone number associated with a central election office on the ballot tabulation device (such as in cases where the election staff have pre-programmed the device with an incorrect telephone number).
h. Re-sending a file from the ballot tabulation device to a modem telephone number associated with the central election office (such as in cases where the original file was corrupted during transmission and needs to be sent a second time).
i. Disabling a function of the ballot tabulation device (such as in cases where a counterfeit ballot detection sensor must be disabled because a polling location has run out of ballots and the election administrator instructs a poll worker to make photocopies of the ballot).
j. Installing a memory device in the ballot tabulation device (such as in cases where the original ballot tabulation device fails, and the memory device from the original device must be moved to a new back-up ballot tabulation device).
k. Using the ballot tabulation device to print reports (such as in cases where a printer jams and the reports need to be re-printed in their entirety).

Of course, one skilled in the art will understand that other types of actions may be controlled by the central election office in accordance with the present invention.

Exemplary Method for Controlling Actions Taken on Voting Devices

Figure 6:
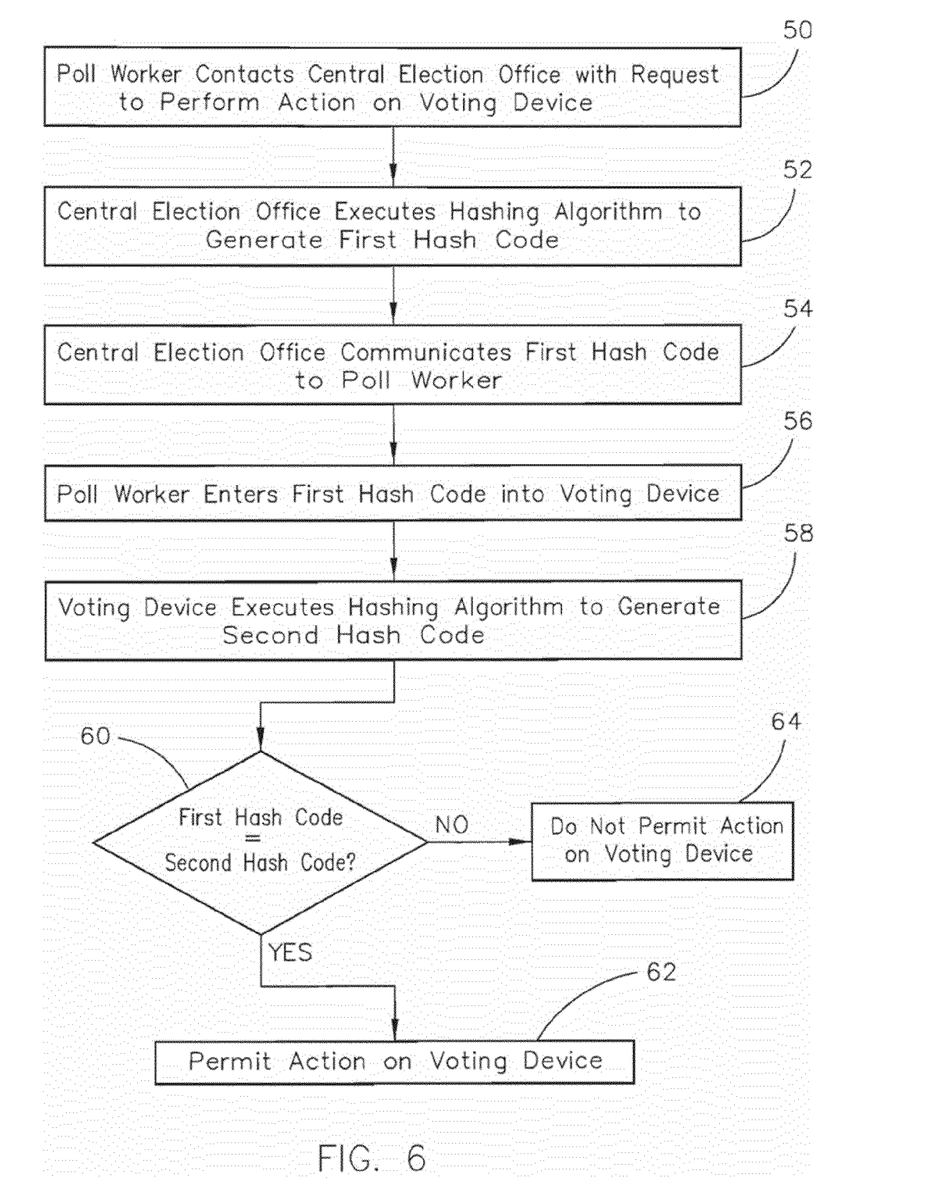
FIG. 6 is a process flow diagram of an exemplary hash code verification process that is used to control actions taken on a voting device.

Referring now to FIG. 6, a process flow diagram is provided that shows an exemplary method for maintaining control over actions taken by poll workers or other users on voting devices located at various polling locations. At block 50, a poll worker or other user contacts the central election office with a request to perform an action on a voting device. At block 52, if the election administrator determines that the poll worker or other user should be permitted to perform the requested action, the election administrator accesses the election management system to obtain a first hash code associated with the action. The election management system then executes a hashing algorithm to generate the first hash code.

In one aspect of the invention, the hashing algorithm generates the hash code using data stored in the election management system (wherein the same data is also stored in the voting device, as described below). Examples of such data include a voter registration number, a voter name, a voter date of birth, a voter address, an election name, an election date, an election identification code, a precinct number, a polling place identification code, a serial number of the voting device, and a serial number of a removable memory device installed in the voting device. Of course, it can be appreciated that the action and associated voting device will determine the types of data that may be used to generate the hash code.

If the data or combination of data used to generate the hash code is unique, then the hash code will comprise a unique code associated with the action. However, if the data or combination of data used to generate the hash code is not unique, then the hash code will comprise a non-unique code that may be used to permit other actions on other voting devices. For example, the same hash code could be provided to a poll worker for use in performing the same action on several voting devices located at a polling location (e.g., opening the polls on several ballot tabulation devices). A hash code may also be provided with an index number (e.g., 1, 2, 3, 4, 5, etc.) to indicate the number of times that the hash code is used in connection with a voting device. In this case, the hash code and index number will comprise a unique code that can be used once in connection with the voting device.

In another aspect of the invention, the hashing algorithm generates the hash code using information entered into the election management system in connection with the request to perform the action. The information entered into the election management system may include, for example, a time period specified by the election administrator during which the poll worker or other user is permitted to perform the action on the voting device. For example, if the action is opening or closing polls on a ballot tabulation device, a time-based code may be used to ensure that the polls are not opened or closed too early. The time period specified by the election administrator is then represented by a time period identifier that is used by the hashing algorithm to generate the hash code (typically in conjunction with other data, as described above). For example, a 24-hour day may be broken-up into 24 time periods, wherein 12:00 am to 1:00 am is represented by the time period identifier "1," 1:00 am to 2:00 am is represented by the time period identifier "2," etc. Of course, one skilled in the art will understand that a 24-hour day may be broken-up into any number of time periods as desired for a particular application.

Referring again to FIG. 6, at block 54, the central election office communicates the first hash code to the poll worker or other user at the polling location, such as by telephone, e-mail, or any other type of communication method. At block 56, the poll worker or other user enters the first hash code into an input device of the voting device. For example, if a poll worker or other user attempts to perform an action on a voting device and that action requires prior approval of the central election office, then the touch screen display of the voting device may display a prompt requesting the poll worker or other user to enter the first hash code (sometimes referred to as a "pass code").

At block 58, the voting device executes a hashing algorithm (i.e., the same hashing algorithm executed by the election management system) to generate a second hash code associated with the action. Because the election data on the voting device is loaded from the election management system, the same data resides on both the election management system and the voting device. Accordingly, the second hash code generated by the voting device will be the same as the first hash code generated by the election management system. If the first hash code comprises a time-based code (as discussed above), the voting device will use its internal clock to determine a second time period identifier that is used by the hashing algorithm to generate the second hash code. At block 60, the voting device compares the second hash code to the first hash entered by the poll worker or other user in order to verify the validity of the first hash code. At block 62, if the validity of the first hash code is verified, the action is permitted on the voting device. However, at block 64, if the validity of the first hash code is not verified, the action is not permitted on the voting device.

Exemplary Method for Using a Poll Book to Un-Issue a Voting Credit

The method of controlling actions taken on voting devices described above in connection with FIG. 6 may be used in connection with a variety of different types of voting devices and a variety of different types of actions taken by poll workers or other users. To illustrate a specific application of this method, a process flow diagram is provided in FIG. 2 that shows an exemplary method that is used by a poll worker to check-in a voter and, if necessary, un-issue a voting credit previously issued to the voter using poll book 12 shown in FIG. 1.

Figure 2:
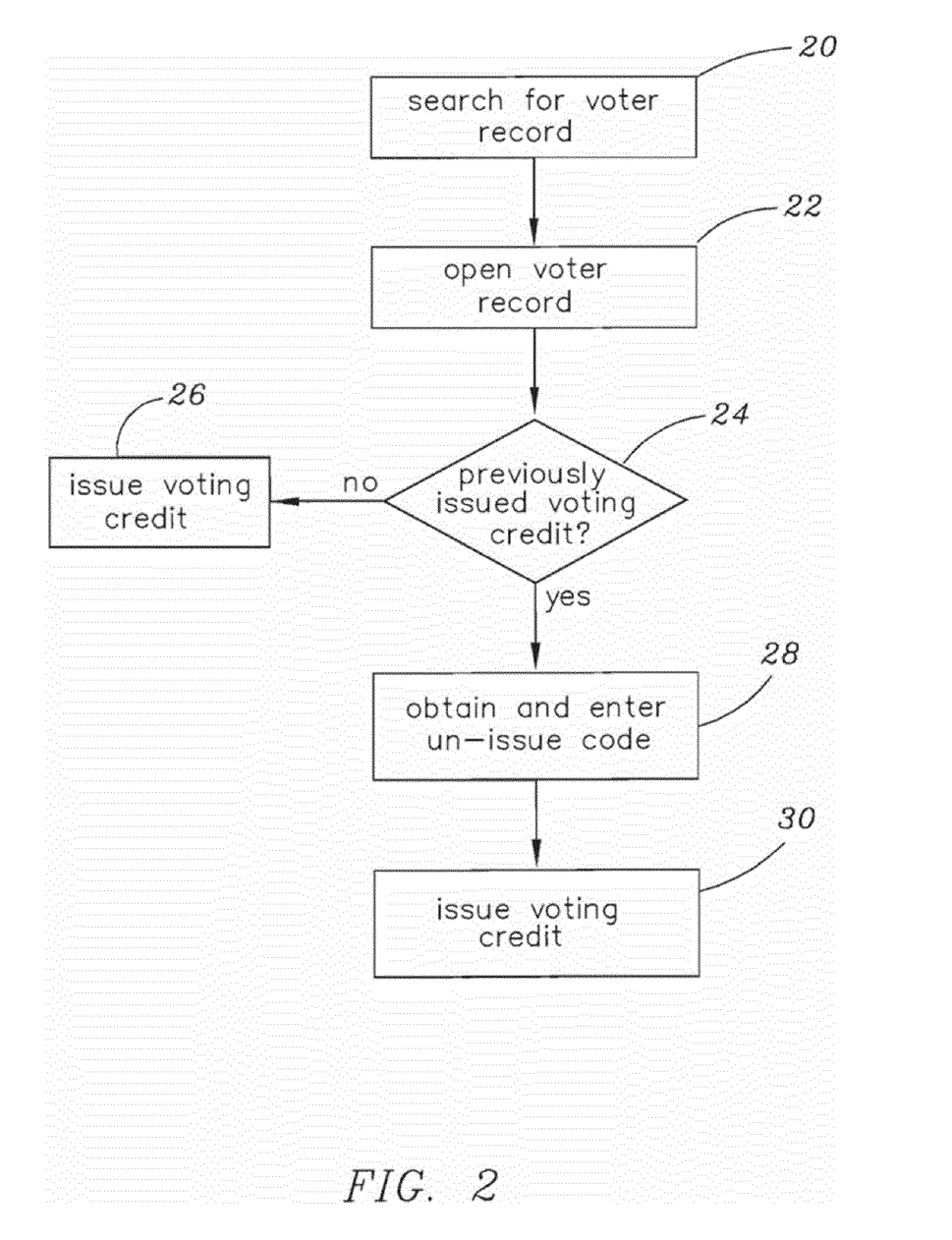
FIG. 2 is a process flow diagram of an exemplary voter check-in process and un-issuing voting credit process, which may be implemented by a poll worker using the electronic poll book of FIG. 1.
Figure 3A:
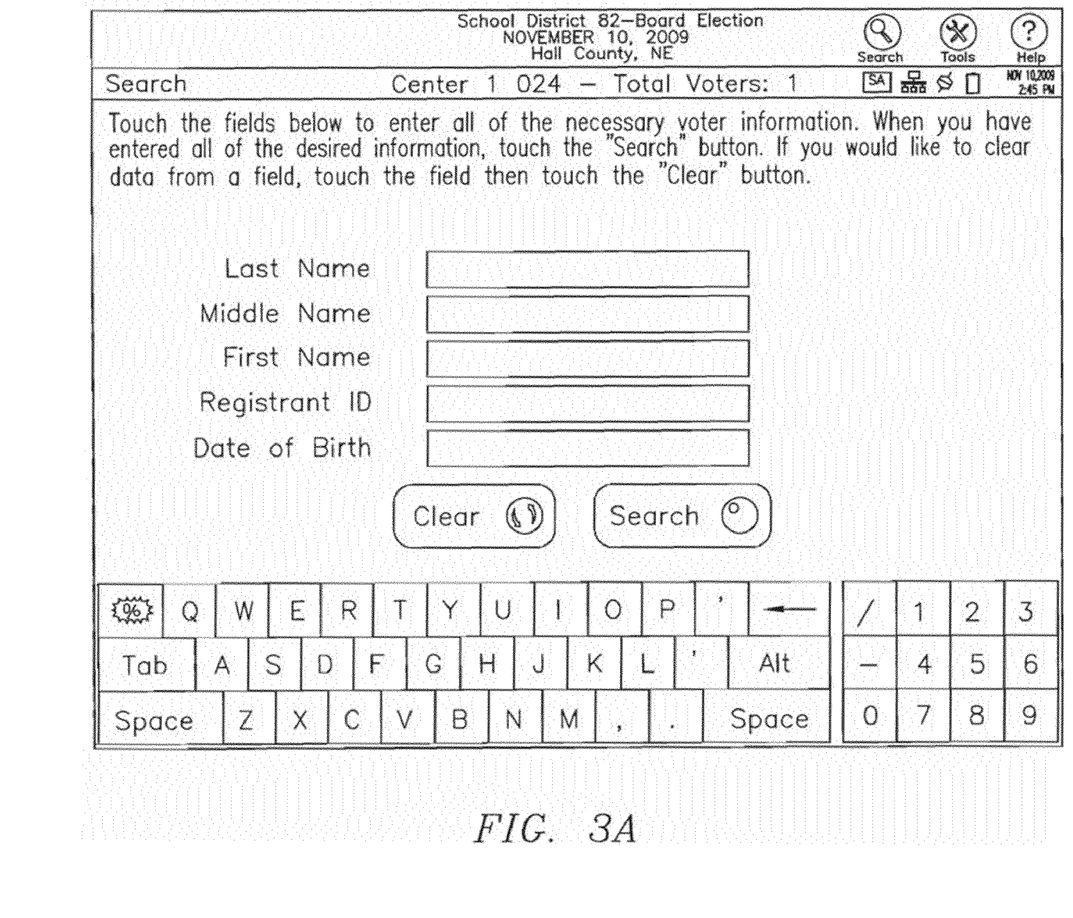
FIGS. 3A-3E are various screen shots of the electronic poll book of FIG. 1 during the voter check-in process and un-issuing voting credit process.

Referring to FIG. 2, at block 20, when a voter enters a polling location and indicates her desire to vote, the poll worker uses poll book 12 to search for and locate the voter record corresponding to the voter. An exemplary "voter search" screen that may be displayed on poll book 12 is shown in FIG. 3A. This screen provides various search fields where voter information may be entered. These fields may include last name, middle name, first name, voter registration number (also called registrant ID), and date of birth. Additional or alternative search fields such as driver's license number, all or part of a social security number, or a year of birth may also be used. In general, the more voter information entered into the various search fields, the fewer search results will be returned. In this embodiment, the search fields may be populated using a touch screen keypad (as shown) or standard keyboard 16. At anytime, the poll worker can select the "clear" button to clear all the search fields and start over.

Figure 3B:
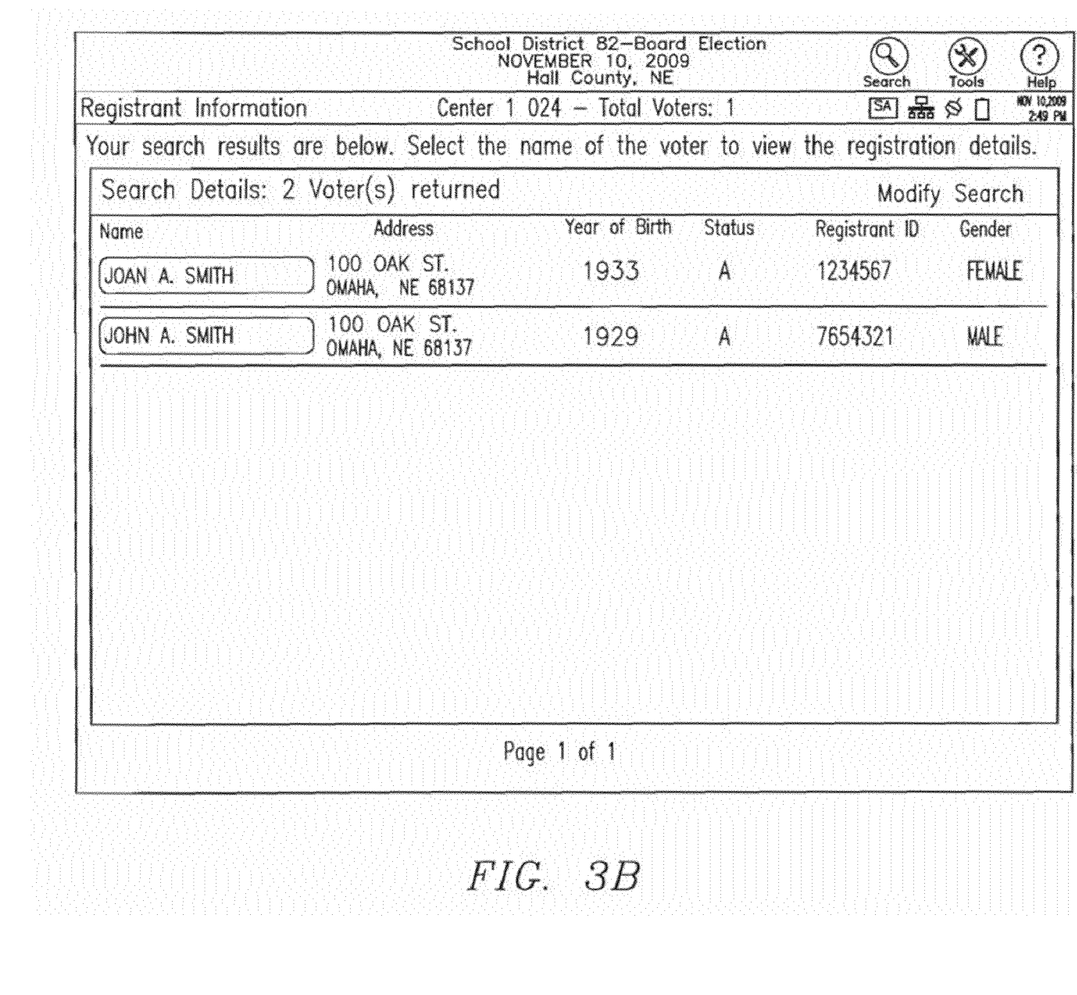

When one or more search fields have been populated, the poll worker selects the "search" button and poll book 12 searches the voter database for voter records that meet the search criteria. All of the voter records that meet the search criteria are located in the voter database and displayed in summary form to the poll worker for review. An exemplary "search results" screen that may be displayed on poll book 12 is shown in FIG. 3B. In this example, the search criteria consisted of the last name "Tagge." As shown, the "search results" screen displays summary information corresponding to each voter record so that the poll worker can readily identify which voting record belongs to the voter currently prepared to vote.

With reference to FIG. 2 at block 22, the poll worker next opens the appropriate voter record for full display. For example, the voter record can be opened from the "search results" screen shown in FIG. 3B by selecting the appropriate voter name. In the present example, Joann Tagge's voter record is selected and opened. In theory, only one voter record will be returned if all the search fields are used to search for a particular voter. If only one voter record is found using the information entered into the search fields by the poll worker, the voter record will open in full without first presenting the poll worker with the "search results" screen of FIG. 3B.

Figure 3C:
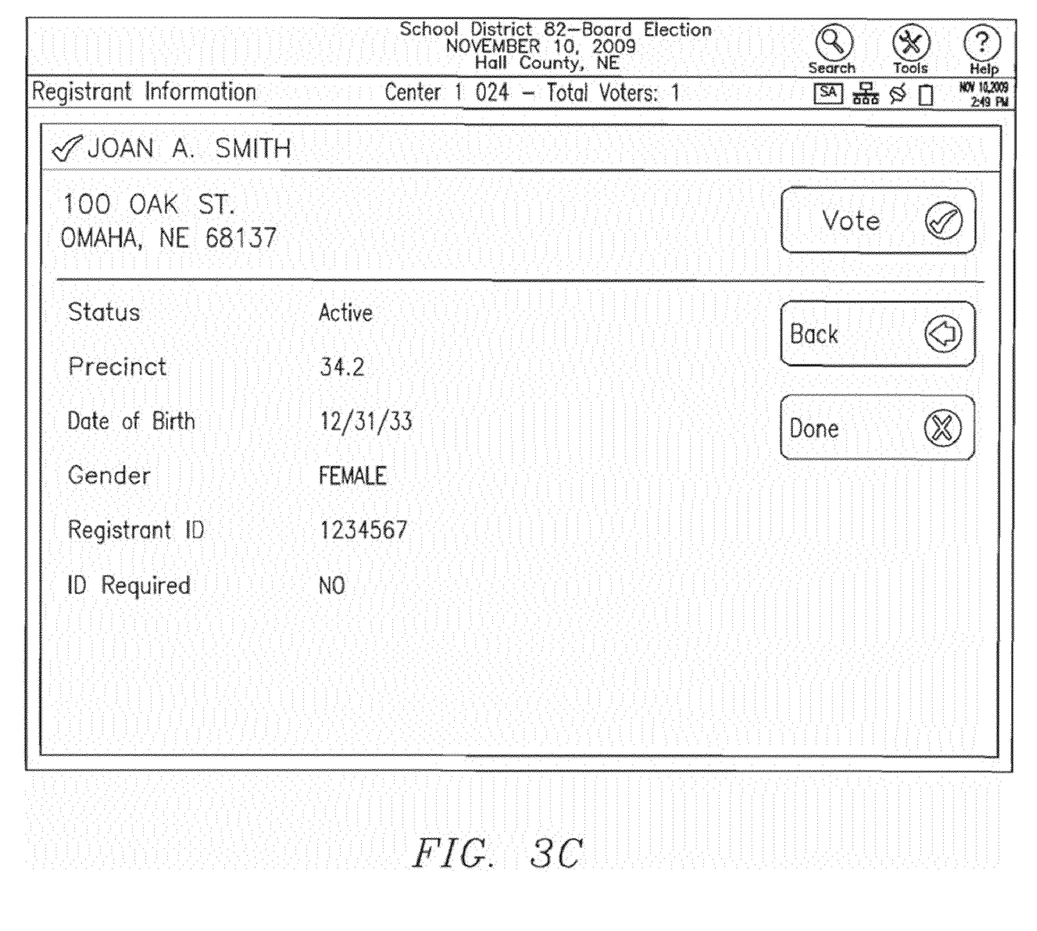

An exemplary "voter record display" screen is shown in FIG. 3C. A typical voter record will include information such as name, address, voter status, precinct identifier, date of birth, gender, registrant ID, and whether identification is required. The "voter record display" screen also informs the poll worker as to whether this voter has already been issued a voting credit for the election.

Wither reference to FIG. 2 at block 24, the poll worker will next determine whether the voter has been previously issued a voting credit for the election. In the exemplary "voter record display" screen shown in FIG. 3C, a voter record is displayed for a voter who was not previously issued a voting credit for the election. The poll worker may select the "vote" button once she is satisfied that this voter record belongs to the voter currently prepared to vote. If the poll worker determines that this is not the correct voter record, the poll worker may select the "back" button to return to the previous screen or the "done" button to return to the initial "voter search" screen.

With reference to FIG. 2 at block 24, the poll worker will issue a voting credit to the voter if a voting credit has not been previously issued and allow the voter to vote and cast a regular ballot for the election. As shown in the exemplary "voter record display" screen of FIG. 3C, the poll worker issues the voting credit by selecting the "vote" button. Optionally, the date, time, or polling location may be recorded in conjunction with the issuance of a voting credit. At this time, a "confirmation" screen may be displayed that informs the poll worker that the check-in process has been completed and that the poll worker may now instruct the voter on how to complete the voting process. After the voter has received her voting instructions, the poll worker can select the "done" button to return to a blank "voter search" screen ready for the next voter in line.

Figure 3D:
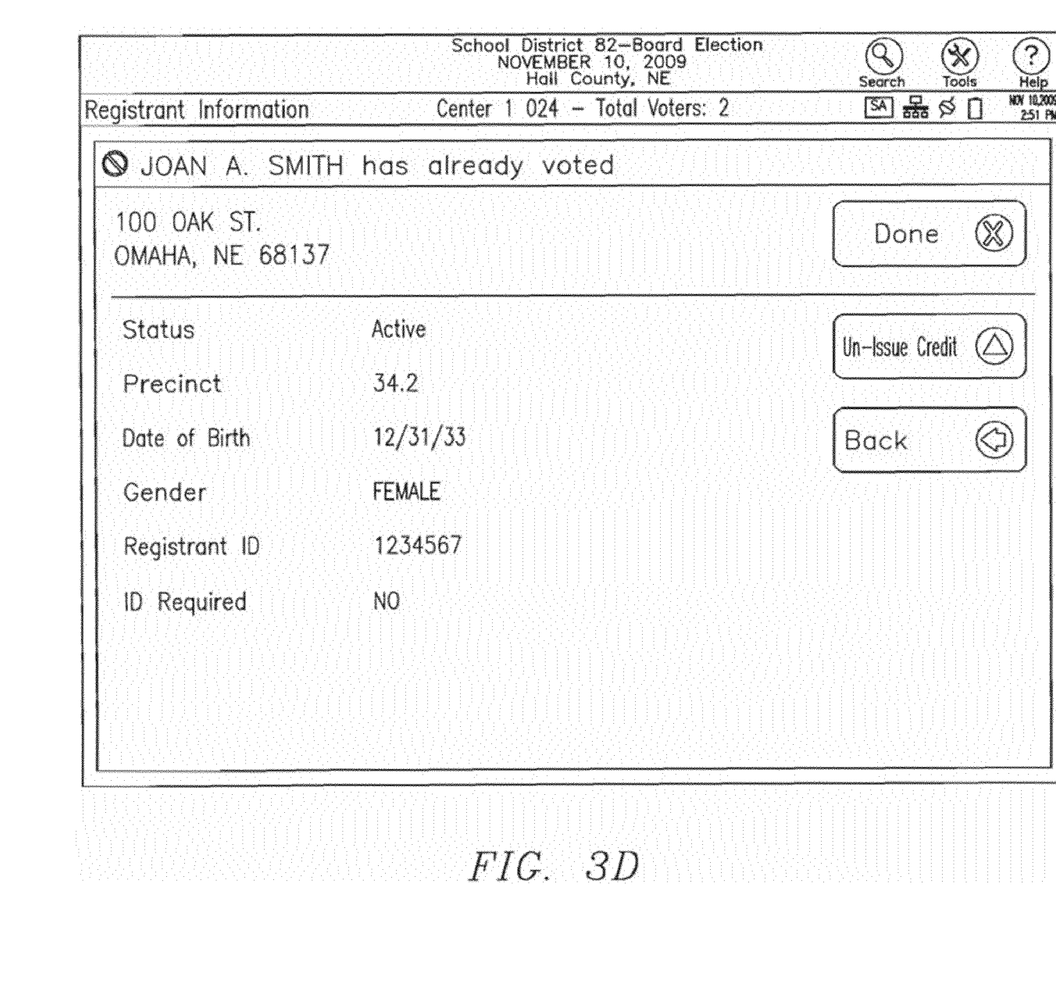

With reference to FIG. 2 at block 28, the poll worker could determine that a voting credit has previously been issued to the voter for the election. In an exemplary "voter record display" screen shown in FIG. 3D, a voter record is displayed for a voter that was previously issued a voting credit for the election. Here, the poll worker may select the "done" button and return to the "voter search" screen or may select the "un-issue credit" button to initiate the un-issue voting credit process. The procedure that a poll worker must follow to determine whether a voting credit was previously issued in error is specific to each jurisdiction.

Figure 3E:
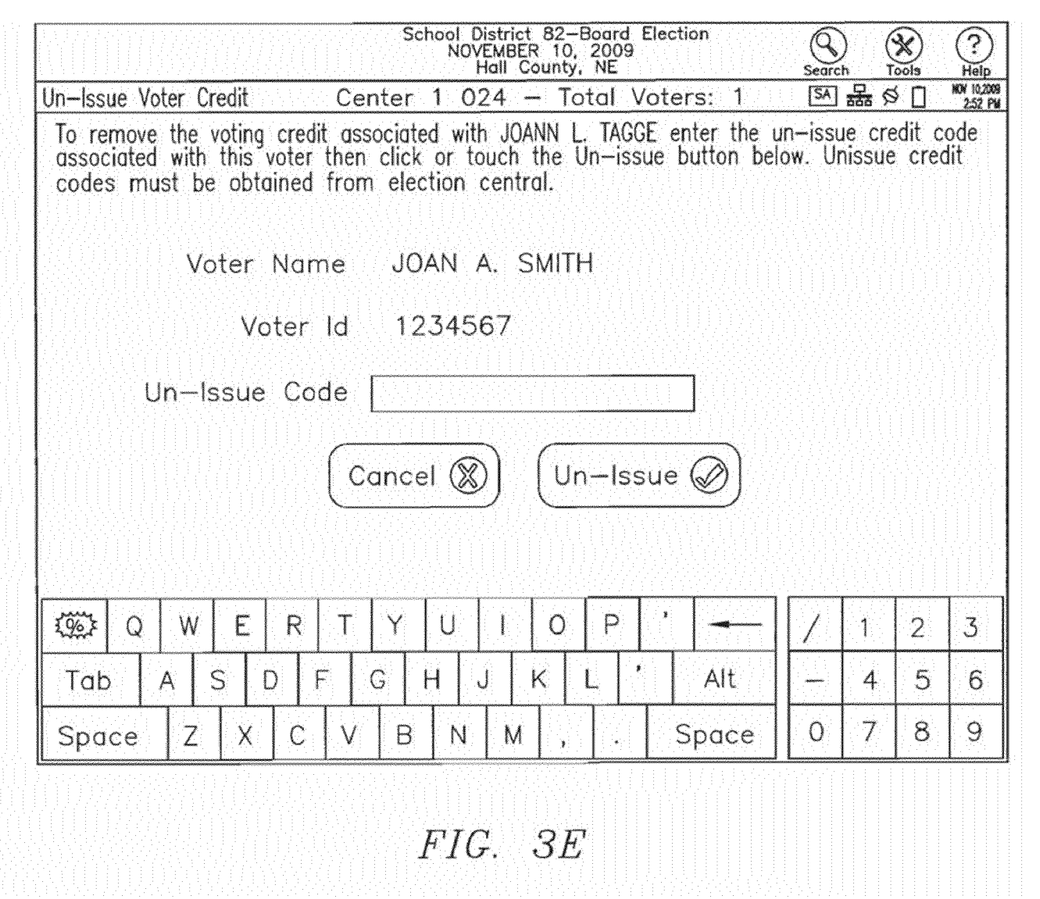

The poll worker initiates the un-issue voting credit process if she believes that the voting credit was initially issued in error. As shown in the exemplary "voter record display" screen of FIG. 3D, the un-issue voting credit process may be initiated by selecting the "un-issue credit" button. After the "un-issue credit" button is selected, the poll worker will be prompted to enter an un-issue code. As shown in the exemplary "un-issue code" screen of FIG. 3E, the poll worker may be presented with instructions on how to un-issue the voting credit.

In the exemplary embodiment, the central election office maintains control over the un-issue voting credit process and administers the un-issue code. In this case, the poll worker may see instructions to contact the central election office on the "un-issue code" screen, as shown in the exemplary screen of FIG. 3E. The poll worker may then telephone, e-mail or otherwise contact an election administrator at the central election office for the purpose of obtaining an un-issue code. A description of how an un-issue code is generated or located for a particular voter is described below in connection with FIGS. 4A and 4B. The poll worker receives the un-issue code from the election administrator and may enter such code as shown in the exemplary "un-issue code" screen of FIG. 3E. After entering the un-issue code, the poll worker may select the "un-issue" button to un-issue the voting credit. The entered un-issue code is then verified to ensure that it is a valid code. With reference to FIG. 1 at block 30, the poll worker will then be able to issue a voting credit and allow the voter to vote a regular ballot in the election as described above in connection with FIGS. 3A-3C.

As mentioned above, in the exemplary embodiment, an election administrator at the central election office makes the determination of whether a voting credit was erroneously issued to a voter in accordance with the laws of the applicable jurisdiction. A voter may be erroneously issued a voting credit, for example, when a poll worker mistakenly selects the voter when checking-in another voter (e.g., when the poll worker selects "John Smith, Jr." when in fact he should have selected "John Smith, Sr."). As another example, a poll worker may check-in a voter and thus issue a voting credit to the voter, whereafter the voter for some reason does not complete the voting process. Other examples are within the scope of the present invention.

Figure 4A:
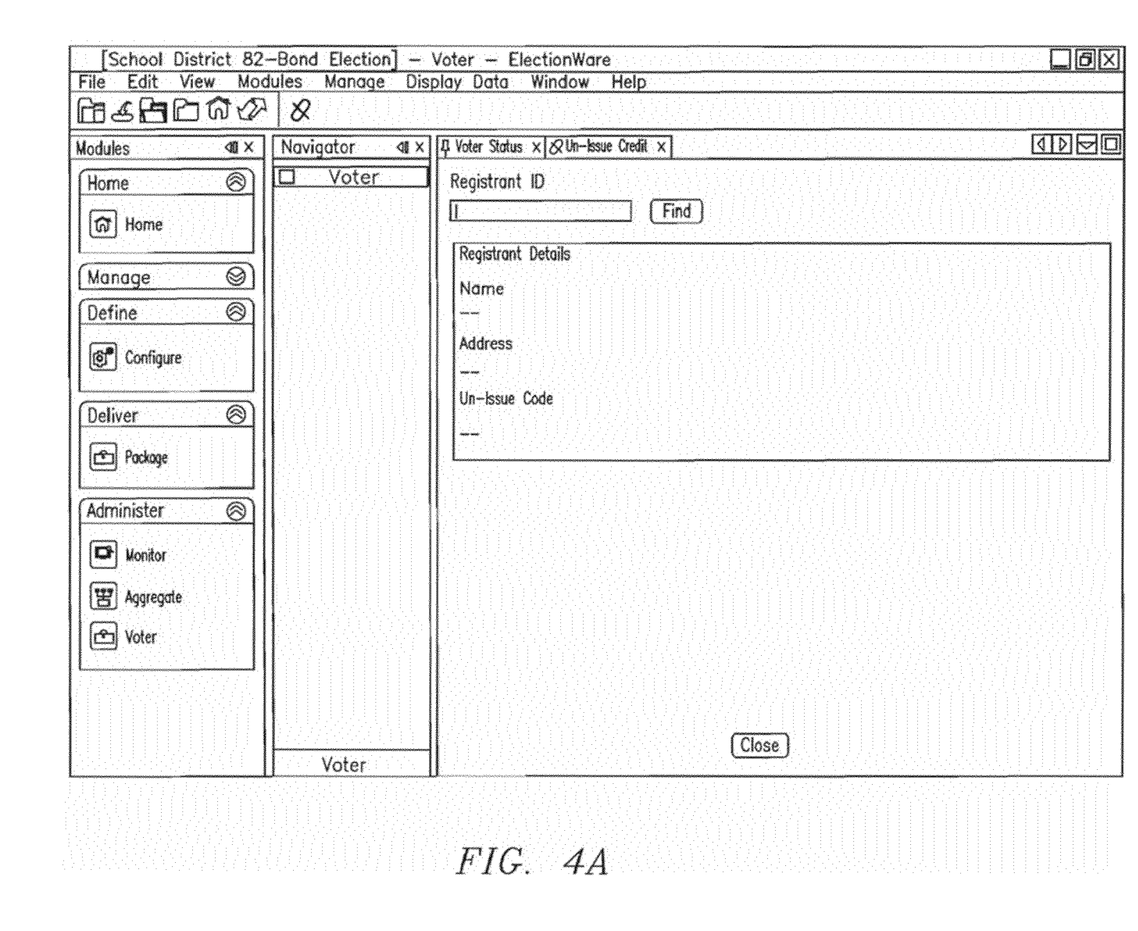
FIGS. 4A-4B are various screen shots of the central election office's computer during the un-issuing voting credit process.
Figure 4B:
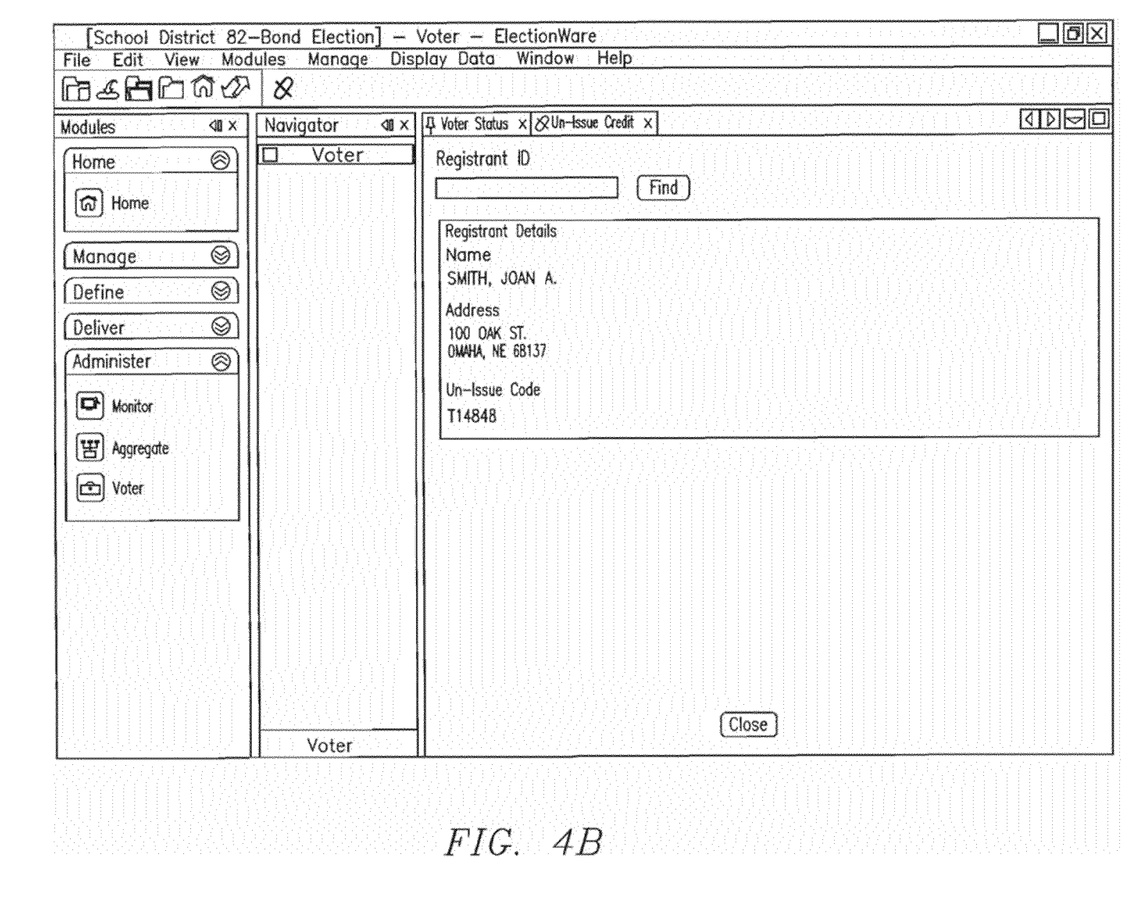

An exemplary process that the election administrator may undertake to generate and provide an un-issue code to the poll worker will now be described with reference to FIGS. 4A and 4B (i.e., after the election administrator has determined that the voting credit was issued in error). Upon request from a poll worker for an un-issue code, the election administrator may access the central voter database using a computer terminal located at the central election office. An exemplary "voter module" screen is shown in FIG. 4A, which depicts an "un-issue credit" tab. By selecting the "un-issue credit tab," the election administrator may enter the registrant ID or other identifying information provided by the poll worker for the voter at issue. Upon selecting the "find" button, the name and address fields corresponding to the identified voter will populate the "registrant details" box, along with an un-issue code associated with the voter, all as shown in the exemplary "voter module" screen of FIG. 4B. The election administrator then communicates the un-issue code to the poll worker (e.g., via telephone, e-mail or otherwise) and the poll worker enters the un-issue code into poll book 12 as described above.

In the exemplary embodiment, the computer terminal located at the central election office generates the un-issue code by running a conventional hashing algorithm against the voter registration number and the election code to generate a hash code. Of course, other data associated with the voter and/or the election could also be used, such as voter name, date of birth, address, election name, election date, or a predetermined seed number. When the poll worker enters the un-issue code/hash code into poll book 12, poll book 12 runs the same conventional hashing algorithm to generate a hash code for the voter. The poll book-generated hash code is then compared to the un-issue code/hash code entered by the poll worker. If the hash codes are identical, the un-issue code/hash code entered by the poll worker is verified and the voting credit is un-issued. It should be understood that verification of the validity of the un-issue code/hash code entered by the poll worker enables the central election office to maintain control over the actions of the poll workers at the various polling locations with respect to the un-issuance of voting credits.

Of course, it should be understood that other types of un-issue codes may be used in accordance with the present invention. For example, the un-issue code may comprise a universal pass code that is the same for each voter. The un-issue code may also comprise a sequence of alphanumeric characters that is unique to each voter. Regardless of the type of un-issue code, poll book 12 is preferably configured to verify the validity of the un-issue code as a prerequisite to permitting un-issuance of a voting credit.

In the exemplary embodiment, the voter database on poll book 12 is preferably configured to store an audit record that includes information relating to the issuance and un-issuance of voting credits for all voters. As such, an auditor or election administrator will be able to view all instances in which a voting credit was issued and all instances in which a voting credit was un-issued in relation to each voter. Also, detailed information about each issuance of a voting credit and/or un-issuance of a voting credit can be generated in a report. For example, the report may include detailed information relating to each instance in which a voting credit was issued and subsequently un-issued, such as the voter name, voter address, voter registration number, date/time that the voting credit was issued, date/time that the voting credit was un-issued, and the un-issue code used. One skilled in the art will appreciate that various types of audit records and reports may be generated in accordance with the present invention.

The present invention has been described above with reference to the terms "processor," "storage device" and "database." It should be understood that as used herein (including in the claims) the term "processor" may mean either a single processor that performs the described processes or a plurality of processors that collectively perform the described processes; the term "storage device" means either a single storage device that stores the described database(s) or a plurality of storage devices that collectively store the described database(s); and the term "database" means either a single database that contains the described data or a plurality of databases that collectively contain the described data. Thus, the system and method may be implemented with any number of processor(s), storage device(s) and database(s) without departing from the scope of the present invention.

While the present invention has been described and illustrated hereinabove with reference to various exemplary embodiments, it should be understood that various modifications could be made to these embodiments without departing from the scope of the invention. Therefore, the invention is not to be limited to the specific embodiments described and illustrated above, except insofar as such limitations are included in the following claims.

What is claimed and desired to be secured by Letters Patent is as follows:

1. A computer-implemented method for controlling actions taken on voting devices, comprising:
   generating, by an election management system comprising a computer located at a central election office and via execution of a hashing algorithm, a first hash code associated with a request to perform an action on a voting device located at a polling location;
   receiving, by a processor of the voting device, the first hash code;
   executing, by the processor of the voting device, the hashing algorithm to generate a second hash code;
   determining, by the processor of the voting device, that the second hash code matches the first hash code; and
   performing, by the processor of the voting device, the action in response to said determining that the second hash code matches the first hash code.

2. The computer-implemented method of claim 1, wherein the first hash code is communicated from the central election office to the polling location.

3. The computer-implemented method of claim 1, wherein the first hash code comprises a unique code associated with the action.

4. The computer-implemented method of claim 1, wherein the first hash code comprises a time-based code that permits the action during a time period.

5. The computer-implemented method of claim 1, wherein the first hash code is provided with an index number to indicate the number of times that the first hash code is used in connection with the voting device.

6. The computer-implemented method of claim 1, wherein the first hash code comprises a non-unique code that is used to permit a plurality of other actions on a plurality of other voting devices.

7. The computer-implemented method of claim 1, wherein the first and second hash codes are generated using data stored in both the election management system and the voting device.

8. The computer-implemented method of claim 7, wherein the data comprises one or more of a voter registration number, a voter name, a voter date of birth, a voter address, an election name, an election date, an election identification code, a precinct number, a polling place identification code, a serial number of the voting device, and a serial number of an removable memory device installed in the voting device.

9. The computer-implemented method of claim 1, wherein the first hash code is generated using information entered into the election management system in connection with the request to perform the action on the voting device.

10. The computer-implemented method of claim 9, wherein the information comprises a time period during which the action is permitted to be performed on the voting device, and wherein the time period is represented by a first time period identifier that is used to generate the first hash code.

11. The computer-implemented method of claim 10, wherein an internal clock of the voting device is used to determine a second time period identifier that is used to generate the second hash code.

12. The computer-implemented method of claim 1, wherein the voting device comprises a poll book.

13. The computer-implemented method of claim 12, wherein the action comprises using the poll book to un-issue a voting credit previously issued to a voter.

14. The computer-implemented method of claim 12, wherein the action comprises using the poll book to change a voter address.

15. The computer-implemented method of claim 12, wherein the action comprises using the poll book to change a party of a registered voter.

16. The computer-implemented method of claim 12, wherein the action comprises using the poll book to issue a provisional ballot to a voter.

17. The computer-implemented method of claim 12, wherein the action comprises recovering the poll book from a failure condition.

18. The computer-implemented method of claim 12, wherein the action comprises synchronizing a database of the poll book with a central database.

19. The computer-implemented method of claim 12, wherein the action comprises updating firmware on the poll book.

20. The computer-implemented method of claim 12, wherein the action comprises using the poll book to print reports.

21. The computer-implemented method of claim 1, wherein the voting device comprises a ballot tabulation device.

22. The computer-implemented method of claim 21, wherein the action comprises clearing vote totals on the ballot tabulation device.

23. The computer-implemented method of claim 21, wherein the action comprises one of locking or unlocking the ballot tabulation device.

24. The computer-implemented method of claim 21, wherein the action comprises one of opening polls, re-opening polls or closing polls on the ballot tabulation device.

25. The computer-implemented method of claim 21, wherein the action comprises changing a modem telephone number associated with the central election office on the ballot tabulation device.

26. The computer-implemented method of claim 21, wherein the action comprises re-sending a file from the ballot tabulation device to a modem telephone number associated with the central election office.

27. The computer-implemented method of claim 21, wherein the action comprises disabling a function of the ballot tabulation device.

28. The computer-implemented method of claim 21, wherein the action comprises installing a memory device in the ballot tabulation device.

29. The computer-implemented method of claim 21, wherein the action comprises using the ballot tabulation device to print reports.

30. The computer-implemented method of claim 1, wherein the voting device comprises a ballot marking device.

31. The computer-implemented method of claim 1, wherein the voting device comprises a direct recording electronic voting machine.

32. A system for controlling actions taken on voting devices, comprising:
    an election management system comprising a processor programmed to execute a hashing algorithm and generate, using the hashing algorithm, a first hash code associated with a request to perform an action; and
    a voting device comprising an input device that provides for manual entry of the first hash code, the voting device further comprising a processor programmed to (i) receive the first hash code from the input device; (ii) execute the hashing algorithm and generate a second hash code, (iii) compare the second hash code to the first hash code to determine whether the second hash code matches the first hash code, and (iv) perform the action when the second hash code matches the first hash code.

33. The system of claim 32, wherein the election management system is located at a central election office, wherein the voting device is located at a polling location, and wherein the first hash code is communicated from the central election office to the polling location.

34. The system of claim 32, wherein the first hash code comprises a unique code associated with the action.

35. The system of claim 32, wherein the first hash code comprises a time-based code that permits the action during a time period.

36. The system of claim 32, wherein the first hash code is provided with an index number to indicate the number of times that the first hash code is used in connection with the voting device.

37. The system of claim 32, wherein the first hash code comprises a non-unique code that is used to permit a plurality of other actions on a plurality of other voting devices.

38. The system of claim 32, wherein the first and second hash codes are generated by the hashing algorithm using data stored in both the election management system and the voting device.

39. The system of claim 38, wherein the data comprises one or more of a voter registration number, a voter name, a voter date of birth, a voter address, an election name, an election date, an election identification code, a precinct number, a polling place identification code, a serial number of the voting device, and a serial number of an removable memory device installed in the voting device.

40. The system of claim 32, wherein the first hash code is generated using information entered into the election management system in connection with the request to perform the action.

41. The system of claim 40, wherein the information comprises a time period during which the action is permitted to be performed on the voting device, and wherein the time period is represented by a first time period identifier that is used to generate the first hash code.

42. The system of claim 41, wherein the processor uses an internal clock of the voting device to determine a second time period identifier that is used to generate the second hash code.

43. The system of claim 32, wherein the voting device comprises a poll book.

44. The system of claim 43, wherein the action comprises one of the following:
    using the poll book to un-issue a voting credit previously issued to a voter; using the poll book to change a voter address; using the poll book to change a party of a registered voter; using the poll book to issue a provisional ballot to a voter; recovering the poll book from a failure condition;
    synchronizing a database of the poll book with a central database; updating firmware on the poll book; and using the poll book to print reports.

45. The system of claim 32, wherein the voting device comprises a ballot tabulation device.

46. The system of claim 45, wherein the action comprises one of the following:
    clearing vote totals on the ballot tabulation device; locking the ballot tabulation device;
    unlocking the ballot tabulation device; opening polls on the ballot tabulation device; re-opening polls on the ballot tabulation device; closing polls on the ballot tabulation device; changing a modem telephone number associated with the election management system on the ballot tabulation device; re-sending a file from the ballot tabulation device to a modem telephone number associated with the election management system; disabling a function of the ballot tabulation device; installing a memory device in the ballot tabulation device; and using the ballot tabulation device to print reports.

47. The system of claim 32, wherein the voting device comprises a ballot marking device.

48. The system of claim 32, wherein the voting device comprises a direct recording electronic voting machine.

49. The voting device of claim 32, wherein the voting device comprises a ballot marking device.

50. The voting device of claim 32, wherein the voting device comprises a direct recording electronic voting machine.

* * * * *